Aug. 30, 1966 C. C. FRANCISCO 3,269,185
DEWPOINT SENSING STRUCTURE
Filed Jan. 28, 1963 3 Sheets-Sheet 3

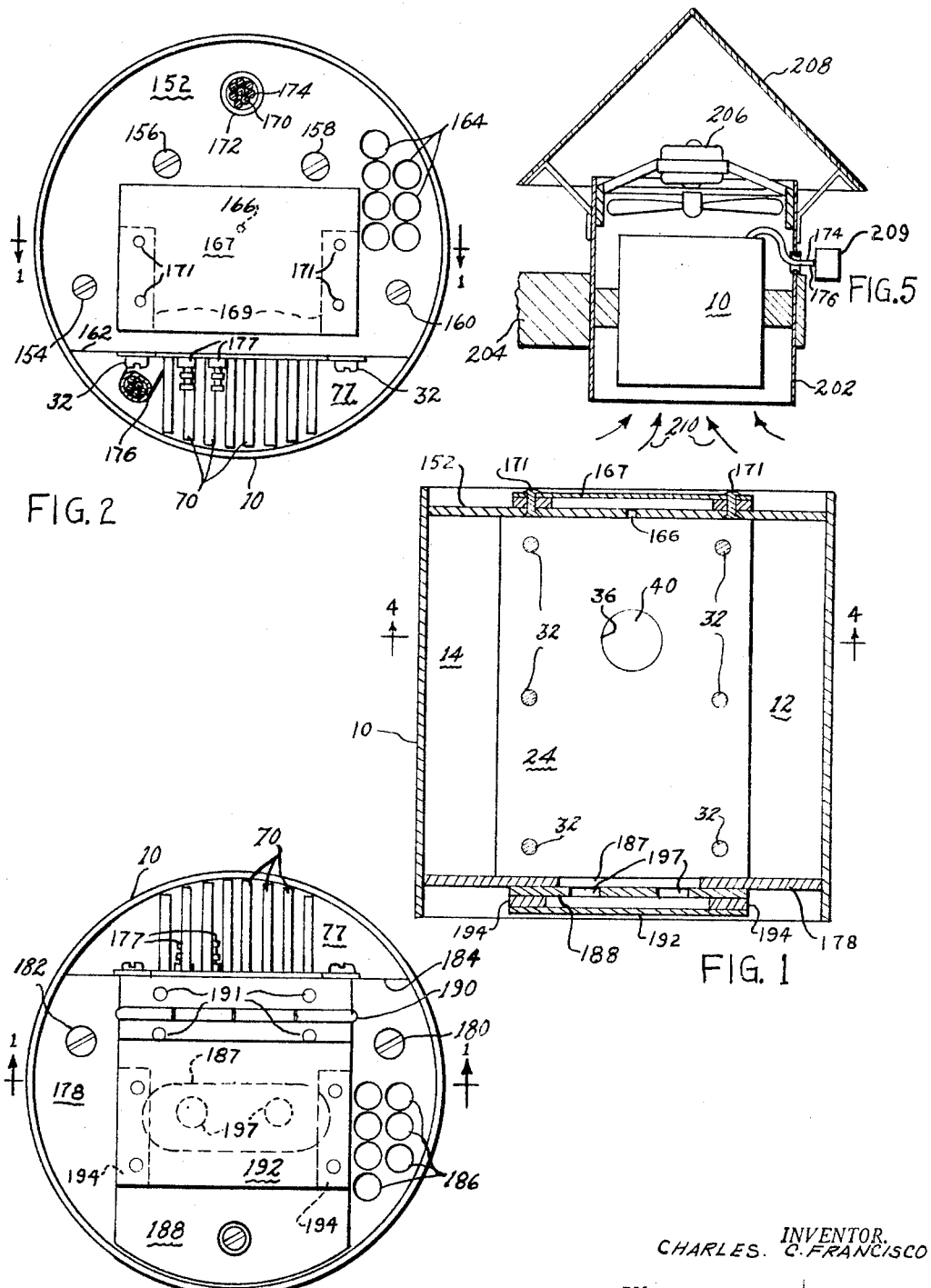

INVENTOR.
CHARLES C. FRANCISCO
BY
*Walter J. Kreske*
ATTORNEY 3,269,185
DEWPOINT SENSING STRUCTURE
Charles C. Francisco, Watertown, Mass., assignor to Cambridge Systems, Inc., Watertown, Mass., a corporation of Massachusetts
Filed Jan. 28, 1963, Ser. No. 254,191
10 Claims. (Cl. 73—336.5)

This invention relates to dewpoint sensing structures and more particularly an improved dewpoint sensing structure of the type having a mirror surface cooled to the temperature at which vapor begins to condense thereon, and is particularly suitable for use in the dewpoint measuring system described in my application entitled Dewpoint Measuring System, Serial No. 254,235, filed Jan. 28, 1963, now Patent No. 3,195,344, issued July 20, 1965.

Dewpoint measuring systems of the type using reflective mirror surfaces cooled to the dewpoint temperature in the sensing structures have heretofore involved many problems to their continued proper operation. One of these problems has been cumbersome bulkiness of structure to accommodate the heretofore necessary refrigerating apparatus for cooling the mirror surface. Also, frequent cleaning of the mirror surface has heretofore been necessary to remove error creating residues caused by settling particles from the surrounding gas as well as residues from dissolved materials in the dew on the mirror.

These problems have been significantly reduced in the present invention of an improved dewpoint sensing structure which also includes other desirable features and advantages. Among these other desirable features and advantages are the provision of a dewpoint sensing structure which is very light in weight, readily hand portable and small in physical size to thereby lend itself to use in confined locations as well as for general meterological dewpoint measurement in the atmosphere both at ground level and at high altitudes.

Primary objects of the present invention include the provision of a dewpoint sensing structure which is dimensionally small, compact, light in weight, hand portable and reliable in its operation over long periods without servicing of any kind.

Another object is the provision of a dewpoint sensing structure which inherently lends itself to operation minimizing undesired effects of residue deposits on the dewforming mirror surface therein.

And a further object is the provision of a dewpoint sensing structure having a configuration which minimizes the formation of residues on the dewforming mirror surface.

A still further object is the provision of a dewpoint sensing structure which is relatively easy to service at the infrequent intervals when such servicing may be desirable.

Further objects include the provision of a dewpoint sensing structure which is rugged, highly resistant to shock and vibration, has a long useful life, and is relatively simple and inexpensive to manufacture in quantity.

These and other objects, features and advantages are achieved generally by providing a chamber having an inlet and an outlet for flow of a gas whose dewpoint is to be measured, a mirror with a highly reflective surface in the chamber, a thermoelectric cooler with its cold side thermally engaging the mirror, a directional light source for illuminating the reflective surface, a first photosensitive element mounted to receive directly reflected light from the mirror surface, and a second photosensitive element mounted to receive only scatter light from the mirror surface.

By isolating the light source and photosensitive elements in separate chambers and providing lenses in each of the chambers for light communication with the mirror surface a higher and more accurate illumination level for operation is thereby achieved as well as a reduction in temperature dependence effects of the photosensitive elements.

By making the photosensitive elements in the form of photoresistors, adaptability to relatively simple and very accurate resistance bridge structure applications is thereby achieved.

By providing auxiliary light to the photosensitive element receiving only scatter light from the mirror surface, further increase in operating light intensity is achieved to further reduce temperature dependence effects in the phtosensitive elements as photoresistors. Also it achieves an ability to create an equilibrium condition at dew formation on the mirror at a point when the light intensities on both photosensitive elements are substantially equal. Such equilibrium condition achieves an error balancing out effect and results in more accurate dewpoint tracking even under mirror contamination conditions.

By placing the mirror surface in a normal operating position with respect to the ground whereby the perpendicular component of the line of force of gravity with respect to the mirror surface will be substantially zero or directed away from the mirror surface, contaminating particle deposit tendency is thereby minimized and retarded.

By providing a heat insulating filler about the thermoelectric cooler in manner to confine heat flow in the cooler to substantially a single direction originating from the mirror surface toward the hot side of the thermoelectric cooler, increased range of dewpoint temperature operation is thereby achieved as well as the isolation and removal of hot side influences on instrument indications.

FIG. 1 is a cross sectional view of a preferred embodiment of the invention taken in line 1—1 of FIGS. 2, 3 and 4.

FIG. 2 is a top view of the embodiment shown in FIG. 1.

FIG. 3 is a bottom view of the embodiment shown in FIG. 1.

FIG. 5 is a cutaway view showing a practical operating arrangement of the FIG. 1 embodiment.

Figure 4:
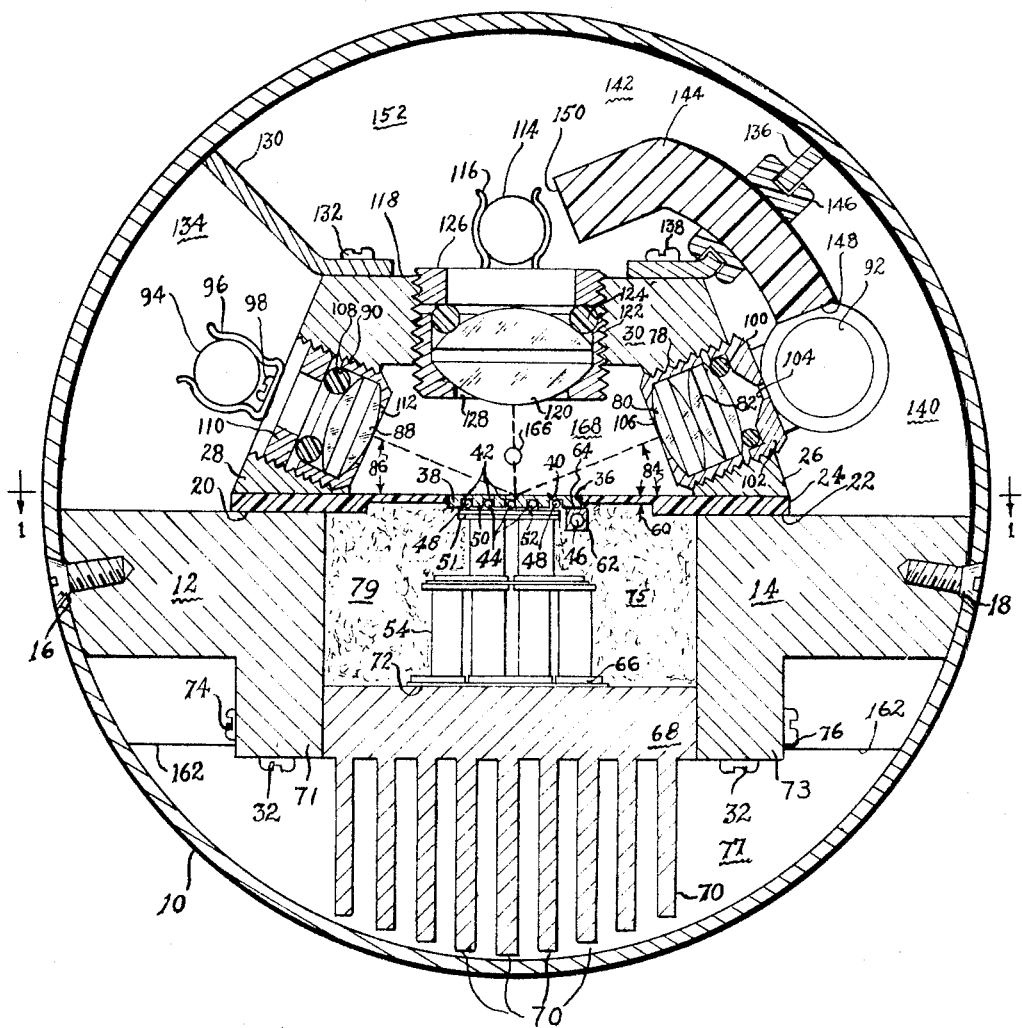
FIG. 4 is a cross sectional view taken on line 4—4 of FIG. 1 to more clearly show internal construction of the FIG. 1 embodiment.

Referring to FIGS. 1 through 4 in more detail, the dewpoint sensing structure in the present invention has a cylindrical wall housing 10 which may be of any suitable material such as stainless steel, aluminum or a rigid plastic. The housing 10 has mounted to the wall thereof a pair of base support members 12 and 14 preferably of a low thermal conductivity material and held in place as by screws 16 and 18 respectively. The bases 12 and 14 have parallel surfaces 20 and 22 located substantially centrally of the housing 10. The surfaces 20 and 22 have securely mounted thereto a moisture barrier plate 24 preferably of a non hygroscopic, low thermal conductivity material such as Teflon and preferably black to minimize light reflection therefrom. The barrier plate 24 is held tightly against the surfaces 20 and 22 by the ends of legs 26 and 28 of a mounting channel formation 30 which is held securely in place by screws 32 thereby creating a hermetically tight seal between the Teflon barrier plate 24 and the surfaces 20 and 22 respectively.

An opening 36 substantially centrally of the Teflon barrier 24 carries therein a high thermal conductivity member 38 of small mass and the top surface of which is highly polished to form a mirror surface 40. The heat conductive member 38 is preferably made of such highly conductive material as copper or silver. If the heat conductive member 38 is made of copper, the surface 40 is preferably plated with silver and a rhodium plating over the silver to retard corrosion of the mirror surface 40. If the member 38 is of silver, a rhodium plating on the polished surface 40 is also preferably applied.

The underside of the heat conductive member 38 has fine grooves 42, the center three of which carry three thermometer leads 44, to a temperature sensitive resistance thermometer element 46. Thereby the temperature of the leads 44 is maintained at all times at the temperature of the heat conductive member 38 to prevent temperature dependence errors due to the leads 44 from affecting response of the resistive thermometer element 46.

The outer two of the grooves 42 in the mirror member 38 carry resistive heater wires 48 for heating the heat conductive mirror member 38 to purge the mirror surface 40 of dew condensed thereon as described in my application entitled Dewpoint Measuring System.

The lands 50 between the grooves 42 at the bottom side of the heat conductive mirror member 38 are fixed in heat conductive engagement with the cold side 52 of a two stage thermoelectric cooler 54 and from which they are also electrically insulated. To achieve this a thin layer of dielectric material 51 such as woven glass or mica in the order of .004 inch thick is cemented between the heat conductive mirror member 38 and the cold side 52 of the thermoelectric cooler 54, preferably with epoxy resin to insure a strong mechanical bond together with electrical insulation and at the same time permitting good heat conductivity between the heat conductive member 38 and the cold side 52 of the thermoelectric cooler 54.

The periphery of the heat conductive mirror member 38 is dimensioned to fit tightly into the opening 36 in the moisture barrier and low thermal conductivity plate 24. The thickness 60 of the barrier plate 24 adjacent the heat conductive mirror member 38 is reduced to as small a dimension as possible commensurate with needed rigidity and seal to minimize heat conduction between the barrier plate 24 and the heat conductive mirror member 38.

The temperature sensitive resistance element 46 is housed in a high thermally conductive holder 62 which is fixed in thermally conductive engagement with the heat conductive mirror member 38 as by a silver solder connection 64 so as to insure free flow of heat between the thermometer holder 62 and the heat conductive mirror member 38.

The hot side 66 of the thermoelectric cooler 54 is fixed in heat conductive engagement with a heat sink or base member 68 carrying cooling fins 70 with the hot side 66 also electrically insulated from the heat sink 68 by a thin sheet of dielectric material 72 similar to the dielectric material 51 at the lands 50 and fastened in place in similar manner preferably with epoxy resin.

The heat sink or base center member 68 is held firmly in place between base legs 71 and 73 of the base support members 12 and 14 as by screws 74 and 76 as a base channel formation which together with the barrier plate 24 form a duct 75 housing the cooler 54 and with the wall of the housing 10 form a suitable air flow duct 77 into which the cooling fins 70 extend for efficient heat dissipation therefrom. Low thermal conductivity material 79 is provided in the duct 75 about the cooler 54 to confine heat flow between the mirror member 38 and base center member 68.

The leg 26 of the mounting channel 30 is angularly disposed with respect to the mirror surface 40 such that a lens holder 78 screwed into an opening substantially perpendicular to the leg 26 will carry a pair of condensing lenses 80 and 82 whose axis is at an angle 84 the same as an angle 86 through the axis of another condensing lens 88 held in a lens holder 90 screwed in an opening in the leg 28. Thereby, light rays from an electric light bulb 92 traveling through the lenses 80 and 82 will be reflected directly from the mirror surface 40 through the lens 88 onto a photosensitive element 94 such as a photoresistor carried in a spring clip 96 fixed to the outside of the leg 28 as by a screw 98. The lenses 80 and 82 are held in place by a ring member 100 of resilient material such as rubber and a retaining ring 102 screwed into the same opening with the lens holder 78. The retaining ring 102 has a reduced opening 104 located at approximately the focal point of the lens 82 so as to appear as a point source of light with the lenses 80 and 82 preferably dimensioned to cause the light to emanate therefrom through an opening 106 as substantially parallel rays illuminating the mirror surface 40.

The receiving lens 88 is held in place in the holder 90 by a ring member 108 of resilient material, such as rubber, and a retaining ring 110. The holder 90 has an opening 112 somewhat larger than the opening 106 to receive the substantially parallel directly reflected rays from the mirror surface 40 which upon passing through the condensing lens 88 illuminate the active surface of the photosensitive element 94.

A second photosensitive element 114 which may be similar to the photosensitive element 94 is held in place by a spring clip 116 similar to the spring clip 96 and similarly fastened in place to the outside surface of a center body portion 118 of the mounting channel 30. The photosensitive element 114 is located at a point substantially centrally of and perpendicular to the mirror surface 40 and arranged to be at approximately the focal point of another converging lens 120 held in a lens holder 122 and fastened in place by a resilient ring 124, similar to the ring 108, and a retaining ring 126.

The lens holder 122 has a large opening 128 to admit scatter light from the reflecting surface 40 through the lens 120 which causes a convergence of the scatter light on the active surface of the photosensitive element 114.

A baffle 130 is fixed at one end as by a screw 132 to the center body portion 118 and the other end engages the inner wall surface of the housing 10 so as to cooperate with the baffle-like base support member 12 to form a chamber 134 isolating the photosensitive element 94 from light sources other than that through the lens 88. A similar baffle 136 is fixed at one end as by a screw 138 to the center body portion 118 with its other end engaging the inner wall surface of the housing 10 to cooperate with the baffle-like base support member 14 to form another chamber 140 from which light from the light bulb 92 may not escape through other than the lenses 82 and 80. The baffles 130 and 136 form a third chamber 142 carrying the photosensitive element 114 which thereby receives light only through the lens 120 and a plastic light channeling member 144 of such material as leucite which is held in a resilient grommet 146 in the baffle 136 with its light receiving face 148 at the light bulb 92 and its light emitting face 150 at the photosensitive element 114.

The top of the housing 10 has a partial closure plate 152 thereon fastened in place as by screws 154, 156, 158 and 160. The screws 154 and 160 are fastened into the base members 12 and 14 respectively and the screws 156 and 158 are fastened in the mounting block 30.

The cover plate 152 has a cutaway edge 162 to permit free flow of air through air flow duct 77. The cover plate 152 also carries therein a plurality of openings 164 (FIG. 2, not shown in FIG. 4) to permit free flow of air through the chamber 140 for cooling the light bulb 92. The cover plate 152 also carries an air flow regulating hole or orifice 166 for the chamber 168 formed by the mounting channel formation 30 and the barrier plate 24. The air flow regulating orifice 166 is shielded from light passage to chamber 168 by a baffle 167 fixed in spaced relation to the cover plate 152 by spacers 169 and rivets 171. The cover plate 152 also has an opening 170 (FIG. 2, not shown in FIG. 4) carrying a protective grommet 172 for electric cables 174 from the light bulb 92 and the photosensitive elements 94 and 114. Sheathed electric cables 176 from the lead wires 44 and from the resistive heater wires 48 appear in the air duct 77. Also appearing in the air duct 77 are terminals 177 for coupling a current source (not shown) to the thermoelectric cooler 54.

The bottom of the housing 10 also carries a bottom closure plate 178 fixed to the base support members 12 and 14 as by screws 180 and 182 respectively. The bottom closure plate 178 has a cutaway edge 184 similar to the cutaway edge 162 of the cover plate 152 to permit free flow of air through the cooling duct 77. The bottom closure plate 178 also has a plurality of openings 186 therein similar to the openings 164 to permit free flow of air through the chamber 140 for cooling the electric light bulb 92. It also has an opening 187 to the chamber 168 for the flow to chamber 168 of air or other gas whose dewpoint is to be detected.

The bottom closure plate 178 also has a door 188 arranged to swing downwardly on a hinge 190 held in place by rivets 191 to provide access through opening 187 to the mirror surface 40 for such infrequent inspection, cleaning or other servicing as may from time to time be desired. The door 188 has a shielding baffle 192 fixed in spaced relation to the door 188 by spacers 194 and rivets 196 so as to allow flow of air or other gas whose dewpoint is desired, through openings 197 in the door 188 and through the opening 187 to the chamber 168, and to prevent light from reaching the chamber 168 through the openings 197 and 187.

An illustrative practical use arrangement for the FIG. 1 embodiment is shown in FIG. 5. In FIG. 5 the housing 10 is held in place by a clamping ring 200 in a duct 202 fastened in place to an anchor member 204. A conventional motor operated fan assembly 206 is mounted in the duct 202 above the housing 10. A protective roof or hood 208 may be fixed to the duct 202 above the fan assembly 206 for providing protection from rain, snow and the like. The cables 174, 176, including cables from the thermoelectric cooler terminals 177, are coupled to a dewpoint measuring system circuit arrangement 209 such as shown and described in my application for patent entitled Dewpoint Measuring System.

In the operation of the FIG. 5 embodiment, air or other gas whose dewpoint is to be measured is drawn upwardly in the direction of arrows 210 by the fan assembly 206 and passes through the cooling duct 77, the light chamber 140 and the mirror chamber 168 and escapes outwardly from under the hood 208.

The rate of flow through the mirror chamber 168 is controlled by the size of the orifice 166 and is restricted to be sufficiently slow to avoid changing the physics of the atmosphere or other gas sample reaching the mirror surface 40 from that of its natural atmospheric or desired use condition so as to insure accurate and reliable characteristics at the mirror surface 40. On the other hand the duct 77 remains unrestricted for maximum flow over the fins 70 to provide maximum heat dissipation therefrom and also unrestricted flow through the openings 186 and 164 through chamber 140 for obtaining proper heat dissipation from the electric light bulb 92 to insure maximum life of the bulb.

The temperature of the mirror surface 40 and the measurement of the dewpoint will be controlled through the cables 174 and 176 by the system circuitry 209 as described in my above mentioned application entitled, Dewpoint Measuring System.

Figure 7:
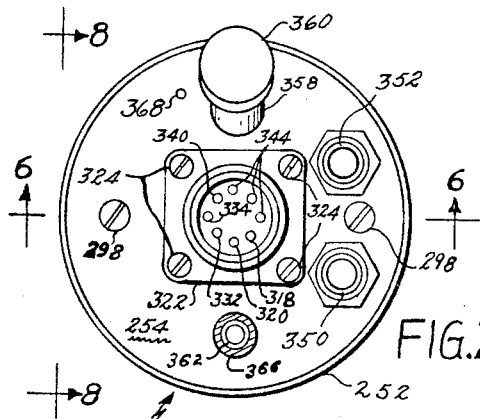
FIG. 7 is a top view of the FIG. 6 embodiment.
Figure 6:
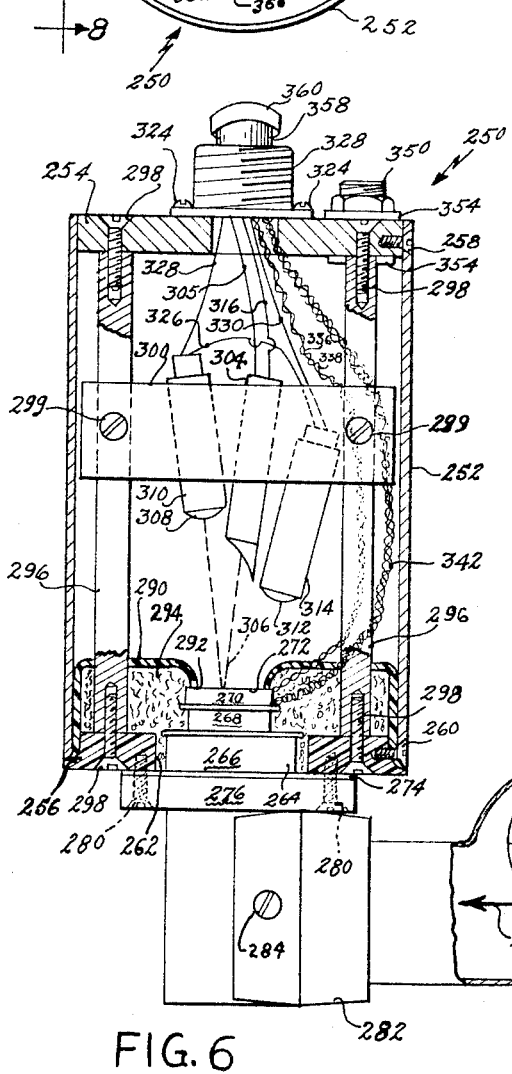
FIG. 6 is a cross sectional view taken on line 6—6 of FIG. 7 illustrating a second embodiment of the invention.
Figure 8:
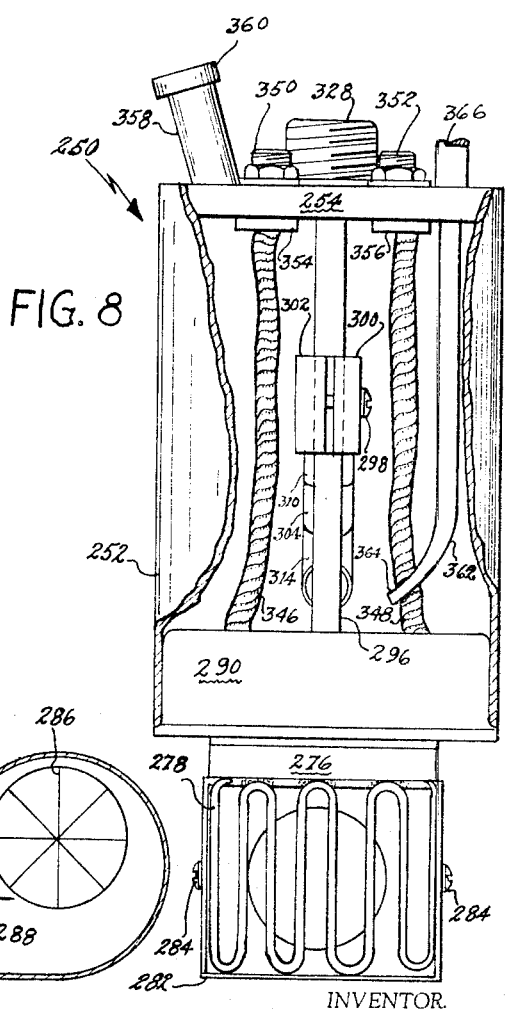
FIG. 8 is a cutaway view taken in the direction of arrows 8—8 of FIG. 7 to more clearly show construction.

Referring to FIGS. 6, 7 and 8 in more detail, a second embodiment of a dewpoint sensing structure in accordance with the present invention is designated generally by the numeral 250. The dewpoint sensing structure 250 has an elongated cylindrical wall housing 252 which may be of any suitable material such as aluminum, stainless steel, or a rigid plastic. The cylindrical wall housing 252 is closed at both ends by rigid disk closure members 254 and 256 at the top and bottom respectively of the housing 252 and held firmly in place as by screws 258 and 260 respectively. The bottom or base closure member 256 is preferably of a low thermal conductivity material such as Teflon and has an axial opening 262 substantially centrally thereof. Extending through the opening 262 is a two stage thermoelectric cooler 264 having a first stage 266 and second stage 268 in heat conductive engagement on which is a high thermally conductive mirror member 270 of such material as silver or copper. The top surface of the mirror member 270 is highly polished to form a highly reflective mirror surface 272 and is preferably plated with rhodium for its high reflectivity retention qualities. The thermoelectric cooler 264 and heat conductive mirror member 270 may be similar to the thermoelectric cooler 54 and heat conductive mirror member 38 described above. The thermoelectric coolers 54 and 270 may also be single stage or three stage thermoelectric coolers depending upon the range of dewpoint temperatures to be measured.

The first stage 266 of the thermoelectric cooler 264 is fastened through a dielectric membrane 274, similar to the membrane 66, to a heat sink 276 of such material as copper or aluminum in manner similar to that described in connection with the heat sink 68. The heat sink 276 has soldered or brazed to the bottom thereof and in heat conducting engagement therewith a heat dissipating fin structure 278.

The thermoelectric cooler 264 and heat sink 276 assembly may be held in place against the underside of the base closure member 256 by screws 280. The rate of heat dissipation from the fin structure 278 may be suitably increased by an airflow directing duct 282 having one end fastened by screws 284 to the end members of the fin structure 278 and the other end of which carries a squirrel cage fan and motor assembly 286 for pushing air in the direction of arrow 288 through the fin structure 278.

A moisture impervious shield 290, preferably of low heat conductivity material such as Teflon is provided with a vapor tight closure 292 about the periphery of the mirror surface 272. The shield 290 cooperates with the base closure 256 to form a chamber 294 about the sides of the thermoelectric cooler 264, which chamber 294 is filled with a suitable electrical and heat and insulating material such as isocyanate foam to thereby isolate the thermoelectric cooler 264 for confining heat flow between the heat conductive mirror member 270 and the heat sink 276.

A pair of support rods 296 extend axially along opposite sides of the wall 252 between the top and bottom closure members 254 and 256 to which they are rigidly fastened at their ends by screws 298. Fixed to the support rods 296 by screws 299 are a pair of yoke members 300 and 302 which carry therebetween a light source and light source housing assembly 304 for directing a beam of light 306 to substantially the center of the reflective surface 272 so as to provide a direct reflection through a condensing lens 308 to a photosensitive member carried in a housing 310 held in place between the yoke members 300 and 302. The photosensitive member in the housing 310 may be similar to the photosensitive element 94 described above and the light source in the housing 304 may be similar to the light source 92 described above. Another photosensitive element similar to the photosensitive element 308 is accessible to light through a condensing lens 312 in a housing 314 held in place by the yoke members 300 and 302 in manner with respect to the reflective surface 272 such that it will not receive direct reflection from the light source 304. The lens 312 is positioned close to the mirror surface 272 to receive scatter light therefrom in increasing intensity as dew begins to form thereon. In the present instance the light source in the housing 304 is coupled through electric cables 315 and 316 to terminals 318 and 320 respectively of a multiterminal receptacle 322 fastened to the top closure member 254 by screws 324.

The photosensitive members in housing 308 and 312 are coupled together by one electric cable 326 with each having another electric cable 328 and 330 respectively coupled to terminals 332 and 334 in the multiterminal receptacle 322. In like manner electric cables 336 and 338 from the resistance heater elements in the heat conductive member 270 are coupled to terminals 318 and 340 respectively in the multiterminal receptacle 322. The three electric cables identified by numeral 342 from the temperature sensitive resistance at the heat conductive member 270 are coupled to the respective remaining terminals 344 in the multiterminal receptacle 322. The multiterminal receptacle 322 so coupled provides a convenient and easy arrangement for coupling to associated circuitry 209 such as shown and described in my dewpoint measuring system application filed this day.

Electric cables 346 and 348 are of a size for carrying the maximum current load of the thermoelectric cooler 264 to which one end of each is coupled, have their other ends coupled to electric screw-on type terminals 350 and 352 respectively fixed to the top closure member 254 and from which they are insulated by dielectric grommets 354 and 356 respectively.

A telescope 358 is also carried in the top closure member 254 and is directed toward the mirror surface 272 for inspection of dew formation and cleanliness of said surface. When not in use, the telescope may carry a removeable closure cap 360 thereon.

A gas flow tube 362 is also fixed through a hole in the top closure member 254 with one end 364 arranged for directing a stream of gas whose dewpoint is to be measured onto the mirror surface 272. The other end of the gas flow tube 362 may carry a flexible tube 366 (only a portion of which is shown in FIG. 6) for positioning in a stream or source of any gas whose dewpoint is to be sensed by the present dewpoint sensing structure.

A small orifice or hole 368 is provided through the top closure member 254 as a suitable escape and regulator for rate of flow of gas through the dewpoint sensing structure 250.

For the operation of the alternative embodiment 250, the thermoelectric cooler terminals 350 and 352 and the terminals in the multiterminal receptacle 322 are coupled to the proper circuits in the system 209 referred to above. Also, power is applied to the blower 286 for moving air over the heat exchanger fins 278, and the flexible tube 366 is placed in a stream or other source of gas whose dewpoint is to be measured. Thereby the mirror surface 272 will commence tracking the dewpoint of the gas appearing at the mirror surface 272 in manner described in my above mentioned application entitled Dewpoint Measuring System.

This invention is not limited to the particular details of construction and operation described as equivalents will suggest themselves to those skilled in the art.

What is claimed is:

1. In a dewpoint sensing structure, the combination of a chamber having an inlet and an outlet for a gas whose dewpoint is to be measured, a mirror having a highly reflective surface in the chamber, a thermoelectric cooler having cold and hot sides with the cold side in thermal engagement with the mirror, a directional light means disposed to illuminate the reflective surface of the mirror, a first photosensitive element mounted to receive directly reflected light from the reflective surface of the mirror, a second photosensitive element mounted to receive only scatter light from the reflective surface of the mirror, heat conductive means in thermal engagement with the hot side of the thermoelectric cooler for maintaining said hot side at substantially the temperature of said gas, and a heat flow insulating filler about the cooler in a manner to confine substantially all heat flow between the mirror and heat conductive means to a path formed by said thermoelectric cooler.

2. The combination as in claim 1 wherein the light means and photosensitive elements are each in a separate chamber isolated from each other with a lens in each of the chambers interposed in the light path to the reflective surface of the mirror.

3. The combination as in claim 1 wherein the photosensitive elements are photoresistors.

4. The combination as in claim 1 wherein the light means and photosensitive elements are each in separate chambers isolated from each other with an auxiliary light channeling structure communicating between the light means and second photosensitive element to provide illumination supplementary to that of the scatter light to said second photosensitive element.

5. The combination as in claim 4 wherein the auxiliary light channeling structure is a transparent plastic rod having two ends, one of which is in light receiving relation to the light means and the other end is in light transferring relation to said second photosensitive element.

6. In a dewpoint sensing structure, the combination of a chamber having an inlet and an outlet for a gas whose dewpoint is to be measured, a mirror having a highly reflective surface in the chamber, a thermoelectric cooler having a cold and hot sides with the cold side in thermal engagement with the mirror, a directional light means disposed to illuminate the reflective surface of the mirror, photosensitive means mounted to receive light reflected from the surface of the mirror, heat conductive means in thermal engagement with the hot side of the thermoelectric cooler for maintaining said hot side at substantially the temperature of said gas whose dewpoint is to be measured, and a heat flow insulating filler about the cooler in a manner to confine substantially all heat flow between the mirror and heat conductive means to a path formed by said thermoelectric cooler.

7. The combination as in claim 6 wherein said last mentioned means includes a heatsink in thermal engagement with the hot side of the thermoelectric cooler and having a multiplicity of heat dissipating fins in the path of said gas whereby to maintain said heatsink at substantially the temperature of said gas.

8. The combination as in claim 6 wherein the normal operating position of the reflective surface of the mirror is such that the perpendicular component of the line of force of gravity will be from a value which is substantially zero to a value which is directed away from the reflective surface of the mirror.

9. In a dewpoint sensing structure, the combination of a base channel formation having a base center member of high thermal conductivity material with a base leg of low thermal conductivity material extending from each side of the base center member to form said base channel, heat exchanger fins of high thermal conductivity material in thermal engagement with the base center member outside the base channel; a rigid mounting channel formation of low thermal conductivity material having a center body portion and a leg extending diagonally from each side of the body portion presenting a cross sectional shape substantially that of a half hexagon; a barrier plate of low thermal conductivity material fastened at two sides between the ends of the base channel legs and the mounting channel legs to form a duct on each side of the barrier plate; a hole in the barrier plate carrying therein a mirror of high thermal conductivity material with a highly reflective mirror surface on the side facing the mounting channel; a thermoelectric cooler in the duct between the barrier plate and the base channel and having a cold and hot sides with the cold side in thermal engagement with the mirror and the hot side fixed in thermal engagement with the base center member; a thermal insulating filler in the duct about the thermoelectric cooler; a separate optical lens structure fixed in each of the mounting channel legs and the mounting channel center body portion and in cooperative relation to said reflective mirror surafce; a photosensitive member mounted at the optical lens structure of one leg and the lens structure of the center body portion with the respective lens interposed between the photosensitive member and the reflective mirror surface; a light source mounted at the optical lens structure of the other leg with the lens interposed between the light source and the reflective mirror surface; a baffle extending outwardly from the channel formation on each side of the photosensitive members and light source; a housing wall enclosure about the baffles and heat exchanger fins to form in cooperation with the baffles and channel formations isolating ducts circumscribing each of the photosensitive members, the light source and the heat exchanger fins; a closure member at each end of the housing wall enclosure carrying openings at the ducts circumscribing the heat exchange fins, the light source and the reflective mirror surface.

10. In a dewpoint sensing structure, the combination of a chamber having an inlet and an outlet for a gas whose dewpoint is to be measured, a mirror having a highly reflective surface in the chamber, a thermoelectric cooler having cold and hot sides with the cold side in thermal engagement with the mirror, a directional light means disposed to illuminate the reflective surface of the mirror, photosensitive means mounted to receive light reflected from the surface of the mirror, heat conductive means including a heatsink electrically insulated from and in thermal engagement with the hot side of the thermoelectric cooler and having a multiplicity of heat dissipating fins in the path of said gas for maintaining said hot side at substantially the temperature of said gas whose dewpoint is to be measured, and insulating means about said thermoelectric cooler between said hot and cold sides for confining the path of substantially all heat flow between the mirror and heat sink to said thermoelectric cooler.

References Cited by the Examiner

UNITED STATES PATENTS

| | | | |
|---|---|---|---|
| 2,256,595 | 9/1941 | Metcalf | 250—227 |
| 2,268,785 | 1/1942 | Thointhwaite | 73—17 |
| 2,459,810 | 1/1949 | Graves et al. | 73—17 |
| 2,624,195 | 1/1953 | Van Allen | 73—336.5 X |
| 2,720,107 | 10/1955 | McBrair | 73—17 |
| 2,769,339 | 11/1956 | Brailsford | 73—336.5 |
| 2,979,950 | 4/1961 | Leone | 73—336.5 |
| 3,112,648 | 12/1963 | Dulk et al. | 73—17 X |
| 3,166,928 | 1/1965 | Jackson et al. | 73—336.5 X |

LEONARD FORMAN, *Primary Examiner.*

ISAAC LISANN, *Examiner.*

W. D. MARTIN, *Assistant Examiner.*